United States Patent
Jenks

(10) Patent No.: US 9,677,717 B2
(45) Date of Patent: Jun. 13, 2017

(54) SYSTEMS AND METHODS FOR CONTROLLING FLOW WITH A 270 DEGREE ROTATABLE VALVE

(71) Applicant: Johnson Controls Technology Company, Holland, MI (US)

(72) Inventor: Russell T. Jenks, Racine, WI (US)

(73) Assignee: Johnson Controls Technology Company, Holland, MI (US)

(*) Notice: Subject to any disclaimer, the term of this patent is extended or adjusted under 35 U.S.C. 154(b) by 23 days.

(21) Appl. No.: 14/178,052

(22) Filed: Feb. 11, 2014

(65) Prior Publication Data

US 2015/0226343 A1    Aug. 13, 2015

(51) Int. Cl.
*F16K 11/087* (2006.01)
*F17D 3/00* (2006.01)

(52) U.S. Cl.
CPC ............ *F17D 3/00* (2013.01); *F16K 11/0873* (2013.01); *Y10T 137/0318* (2015.04); *Y10T 137/86863* (2015.04)

(58) Field of Classification Search
USPC ....... 137/487.5, 625.19, 625.47; 251/129.11, 251/286
See application file for complete search history.

(56) References Cited

U.S. PATENT DOCUMENTS

| | | | |
|---|---|---|---|
| 1,938,425 A * | 12/1933 | Hilkey | F16K 11/085 137/624.13 |
| 1,958,228 A * | 5/1934 | Beardsley | 196/137 |
| 3,090,396 A * | 5/1963 | Rudelick | F16K 11/0856 137/375 |
| 3,935,108 A * | 1/1976 | Forgues | 210/340 |
| 4,232,709 A * | 11/1980 | Zoric | 137/625.47 |
| 4,681,133 A * | 7/1987 | Weston | 137/315.18 |
| 4,921,598 A * | 5/1990 | Desch | 210/136 |
| 5,009,244 A | 4/1991 | Grindley et al. | |
| 5,199,458 A * | 4/1993 | Wen | 137/549 |

(Continued)

FOREIGN PATENT DOCUMENTS

WO    WO-84/01799    5/1984
WO    WO-2007/112532 A1    10/2007

OTHER PUBLICATIONS

Bellimo Ball Valve Features and Benefits, Technical Document; Bellimo Aircontrols (USA), Inc.; dated Jun. 2013, 54 pages.

(Continued)

*Primary Examiner* — John Fox
(74) *Attorney, Agent, or Firm* — Foley & Lardner LLP

(57) ABSTRACT

Systems and methods for controlling flow with a 270 degree rotatable valve are provided. A described system includes a valve body having a valve chamber and a plurality of ports into the valve chamber. The plurality of ports include a first port, a second port, and a third port. The first port and the second port are aligned with a common axis and located on opposite sides of the valve chamber. The system further includes a valve member located within the valve chamber. The valve member is controllably rotatable by approximately 270 degrees to modulate fluid flow between the first port and the third port while maintaining the second port completely closed and to modulate fluid flow between the second port and the third port while maintaining the first port completely closed.

23 Claims, 8 Drawing Sheets

(56) References Cited

U.S. PATENT DOCUMENTS

| | | | |
|---|---|---|---|
| 5,671,911 A * | 9/1997 | Piscitelli | 251/315.14 |
| 5,839,470 A | 11/1998 | Hiejima et al. | |
| 6,098,957 A * | 8/2000 | Vepy | 251/129.12 |
| 6,216,736 B1 * | 4/2001 | Benedetti | 137/625.47 |
| 6,220,566 B1 * | 4/2001 | Miller | F16K 31/1635 |
| | | | 137/487.5 |
| 6,585,003 B2 * | 7/2003 | Steiner et al. | 137/625.47 |
| 8,127,793 B2 * | 3/2012 | Ito et al. | 137/625.47 |
| 8,282,390 B2 | 10/2012 | Albizuri | |
| 8,413,684 B2 | 4/2013 | Thomas | |
| 8,479,772 B2 | 7/2013 | Petrovic et al. | |
| 8,602,058 B1 * | 12/2013 | Del Castillo | 137/625.47 |

OTHER PUBLICATIONS

Bellimo Characterized Control Valve Features and Benefits, Technical Document; Bellimo Aircontrols (USA), Inc.; dated May 2012, 126 pages.

* cited by examiner ns and methods for
controlling flow with a 270
degree rotatable valve

BACKGROUND

Valves are devices that regulate, direct, and/or control the flow of a fluid (e.g., gases, liquids, fluidized solids, slurries, etc.) by opening, closing, or partially obstructing various passageways. Valves are often categorized based on the mechanism used to control fluid flow (e.g., ball valves, butterfly valves, choke valves, piston valves, plug valves, poppet valves, etc.).

Ball valves are a type of valve that typically include a spherical disc or valve member carried within a valve body. The spherical valve member includes a passage that can be selectively aligned with ports in the valve body by rotating the valve member relative to the valve body. When the passage aligns with one port and any number of the remaining ports, the valve is said to be in the open position. When the passage is out of alignment with the ports, the valve is said to be in the closed position. Ball valves are categorized as "quarter-turn" valves because a ninety degree rotation of the valve member (i.e., a quarter turn) is typically used to transition the valve between the open position and the closed position.

Ball valves can be classified based on the number of connections formed by the valve (e.g., two-way valves, three-way valves, etc.), the shape of the passage through the spherical valve member (e.g., L-shaped, T-shaped, X-shaped, etc.), and the size of the passage through the valve member (e.g., full bore, reduced bore, etc.). Three-way ball valves are often used to switch between two separate fluid supplies and/or returns.

Conventional three-way ball valves do not transition between supplies and/or returns without mixing. In a conventional three-way ball valve, rotating the valve member typically causes the flow rate of one fluid supply to be incrementally increased while the flow rate of another fluid supply is incrementally decreased. When the valve member is halfway rotated, the resulting fluid output is generally a mixture of the two fluid supplies.

SUMMARY

One implementation of the present disclosure is valve assembly. The valve assembly includes a valve body having a valve chamber and a plurality of ports into the valve chamber. The plurality of ports include a first port, a second port, and a third port. The first port and the second port are aligned with a common axis and located on opposite sides of the valve chamber. The valve assembly further includes a valve member located within the valve chamber. The valve member is controllably rotatable by approximately 270 degrees to modulate fluid flow between the first port and the third port while maintaining the second port completely closed and to modulate fluid flow between the second port and the third port while maintaining the first port completely closed.

In some embodiments, the valve body is configured to receive a first fluid supply at the first port and a second fluid supply at the second port. Rotating the valve member by approximately 270 degrees may regulate a flow rate of the first fluid supply to the third port and a flow rate of the second fluid supply to the third port without mixing the first fluid supply and the second fluid supply.

In some embodiments, the valve member includes an L-shaped fluid passage extending through the valve member. The fluid passage has an opening at an end thereof. The opening in the fluid passage may be sufficiently large to span a distance between the plurality of ports such that the opening is capable simultaneously overlapping with the third port and at least one of the first port and the second port.

In some embodiments, the valve member includes a rotatable ball having an L-shaped fluid passage extending therethrough. The L-shaped fluid passage may be the only fluid passage through the rotatable ball.

In some embodiments, the valve member is configured to rotate approximately 270 degrees between a first end position in which the first port is fluidly connected with the third port and the second port is closed, and a second end position in which the second port is fluidly connected with the third port and the first port is closed.

In some embodiments, rotating the valve member by approximately 270 degrees between the first end position and the second end position causes the valve member to rotate through a first intermediate position approximately 90 degrees from the first end position and a second intermediate position approximately 90 degrees from the second end position. In some embodiments, in both the first intermediate position and the second intermediate position, none of the plurality of ports are fluidly connected with one another.

In some embodiments, modulating fluid flow between the first port and the third port includes rotating the valve member between the first end position and the first intermediate position. In some embodiments, modulating fluid flow between the second port and the third port includes rotating the valve member between the second end position and the second intermediate position.

In some embodiments, the third port is aligned with a second axis substantially perpendicular to the common axis. The valve member may be configured to rotate about an axis of rotation substantially perpendicular to both the common axis and the second axis. In some embodiments, the valve member is configured to direct fluid flow through the valve chamber only in one or more directions substantially perpendicular to an axis of rotation of the valve member.

Another implementation of the present disclosure is a method for controlling fluid flow through a valve assembly. The method includes providing a valve body having a valve chamber and a plurality of ports into the valve chamber. The plurality of ports include a first port, a second port, and a third port. The method further includes rotating a valve member by approximately 270 degrees within the valve chamber to modulate fluid flow between the first port and the third port while maintaining the second port completely closed and to modulate fluid flow between the second port and the third port while maintaining the first port completely closed.

In some embodiments, the method further includes receiving a first fluid supply at the first port and a second fluid supply at the second port. Modulating fluid flow between the first port and the third port may include regulating a flow rate of the first fluid supply to the third port. Modulating fluid flow between the second port and the third port may include regulating a flow rate of the second fluid supply to the third port. Regulating the flow rates may occur without mixing the first fluid supply and the second fluid supply.

In some embodiments, the valve member includes an L-shaped fluid passage extending through the valve member. The fluid passage has an opening at an end thereof. Rotating the valve member approximately 270 degrees may include rotating the valve member into a rotational position in which the opening spans a distance between the plurality of ports and simultaneously overlaps with the third port and at least one of the first port and the second port.

In some embodiments, rotating the valve member approximately 270 degrees includes rotating the valve member between a first end position in which the first port is fluidly connected with the third port and the second port is closed, and a second end position in which the second port is fluidly connected with the third port and the first port is closed.

In some embodiments, rotating the valve member by approximately 270 degrees between the first end position and the second end position includes rotating the valve member through a first intermediate position approximately 90 degrees from the first end position and a second intermediate position approximately 90 degrees from the second end position. In both the first intermediate position and the second intermediate position, none of the plurality of ports may be fluidly connected with one another.

In some embodiments, modulating fluid flow between the first port and the third port includes rotating the valve member between the first end position and the first intermediate position. In some embodiments, modulating fluid flow between the second port and the third port includes rotating the valve member between the second end position and the second intermediate position.

In some embodiments, the method further includes maintaining the third port completely closed while rotating the valve member between the first intermediate position and the second intermediate position.

In some embodiments, the first port and the second port are aligned with a common axis and located on opposite sides of the valve chamber. The third port may be aligned with a second axis substantially perpendicular to the common axis. In some embodiments, the valve member is configured to rotate about an axis of rotation substantially perpendicular to both the common axis and the second axis.

Another implementation of the present disclosure is a system for controlling fluid flow. The system includes a valve assembly having a valve body and a valve member, an actuator configured to controllably rotate the valve member by approximately 270 degrees relative to the valve body, and a controller configured to operate the actuator to switch, without mixing, between at least one of multiple fluid supplies and multiple fluid returns.

In some embodiments, the valve body includes a valve chamber and a plurality of ports into the valve chamber. The plurality of ports may include a first port, a second port, and a third port. The first port and the second port may be aligned with a common axis and located on opposite sides of the valve chamber. The valve member may be located within the valve chamber and controllably rotatable therein.

In some embodiments, the actuator is configured to controllably rotate the valve member by approximately 270 degrees in response to a control signal from the controller. The actuator may rotate the valve member by approximately 270 degrees to modulate fluid flow between the first port and the third port while maintaining the second port completely closed and to modulate fluid flow between the second port and the third port while maintaining the first port completely closed.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for controlling fluid flow with a 270 degree rotatable valve are shown, according to various exemplary embodiments. The systems and methods described herein may be used to regulate fluid flow from multiple fluid supplies and/or to multiple fluid returns. In some embodiments, the valve is a three-way valve having a valve body and a 270 degree rotatable valve member. The valve body may include a valve chamber and a plurality of ports into the valve chamber (e.g., a first port, a second port, a third port, etc.). The valve member may have an L-shaped passage extending therethrough. The valve may be controlled (e.g., by an actuator and/or a controller) to rotate the valve member by approximately 270 degrees within the valve chamber.

Conventional three-way valves rotate by only 90 degrees to transition between fluid supplies or fluid returns and typically mix the fluid supplies/returns during the transition. To prevent mixing from occurring, conventional three-way valves often have a reduced-bore passage through the rotatable valve member (e.g., reduced relative to the pipelines connecting to the valve). A reduced-bore passage increases friction losses through the valve and causes a pump supplying fluid to the valve to work harder to maintain a satisfactory fluid flow. Advantageously, the systems and methods of the present disclosure use a valve that is rotatable by 270 degrees to switch between fluid supplies and/or fluid returns without mixing and without reducing the bore size.

Figure 1:
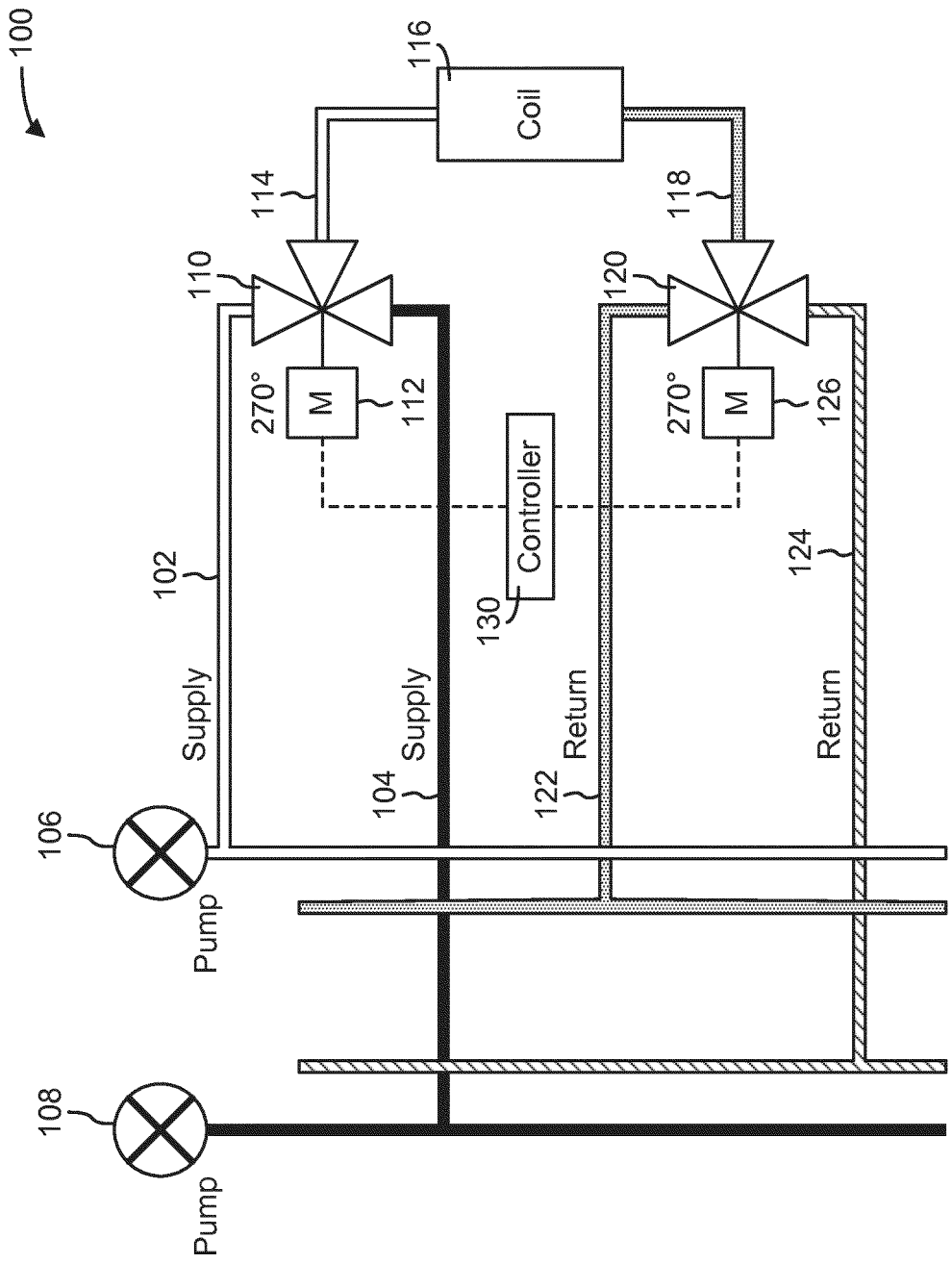
FIG. 1 is drawing of a fluid system including at least one valve configured to rotate by 270 degrees to switch, without mixing, between multiple fluid supplies and/or multiple fluid returns, according to an exemplary embodiment.

Referring now to FIG. 1, a fluid system 100 is shown, according to an exemplary embodiment. Fluid system 100 is shown to include a first fluid supply 102 and a second fluid supply 104. In some embodiments, fluid system 100 is a water manifold system. In a water manifold system, fluid supply 102 may be cold water and fluid supply 104 may be hot water. In other embodiments, fluid supplies 102 and 104 may be various fluids other than water (e.g., various types of gases, liquids, fluidized solids, slurries, etc.). Fluid supplies 102 and 104 may have different temperatures (e.g., hot and cold water) or the same temperature.

Fluid supplies 102 and 104 are shown connecting to a fluid control valve 110. Valve 110 may be a three-way valve configured to control an amount of first fluid supply 102 and second fluid supply 104 permitted to pass through valve 110 and into coil supply line 114. Valve 110 may be configured to rotate by 270 degrees to modulate a flow rate of first fluid supply 102 (e.g., during an initial 90 degrees of the 270 degree rotation) and of second fluid supply 104 (e.g., during a final 90 degrees of the 270 degree rotation) through valve 110 and into coil supply line 114.

Coil supply line 114 is shown connecting to a fan coil unit 116. Fan coil unit 116 may use the fluid from coil supply line 114 as a thermal reservoir from which heat energy can be absorbed (e.g., from hot water or another warm fluid) and/or into which heat energy can be rejected (e.g., into cold water or another coolant). Fan coil unit 116 may intake fluid from coil supply line 114 and output fluid to a coil return line 118.

Coil return line 118 is shown connecting to another fluid control valve 120. Valve 120 may be the same or similar to valve 110. For example, valve 120 may be a three-way valve configured to selectively divert fluid from coil return line 118 to either a first fluid return 122 or a second fluid return 124. Valve 120 may be configured to rotate by 270 degrees to modulate a flow rate between coil return line 118 and either fluid return 122 or fluid return 124 (e.g., without splitting or mixing). In some embodiments, fluid return 122 is a cold water return and fluid return 124 is a hot water return (e.g., for embodiments in which fluid system 100 is a water manifold system).

Figure 3:
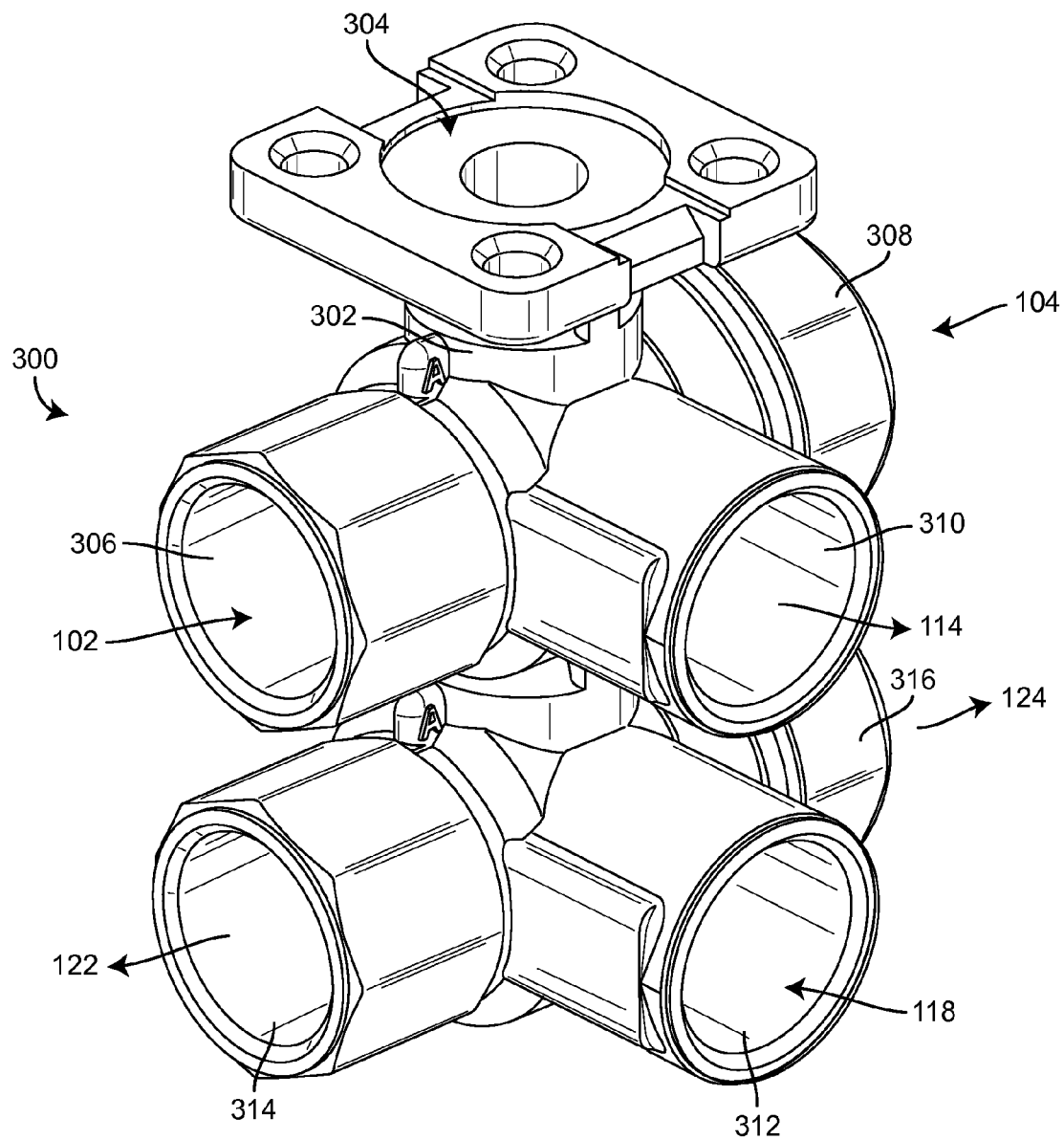
FIG. 3 is a perspective view drawing of a six-way valve configured to simultaneously switch between two fluid supplies and two fluid returns by rotating a single valve member, according to an exemplary embodiment.

Still referring to FIG. 1, fluid system 100 is shown to include a first actuator 112 and a second actuator 126. First actuator 112 may be rotatably coupled to valve 110 and configured to rotate valve 110 by 270 degrees. Second actuator 126 may be rotatably coupled to valve 120 and configured to rotate valve 120 by 270 degrees. In some embodiments, actuators 112 and 126 may be combined into a single actuator (e.g., for embodiments in which valves 110 and 120 are stacked or share a single valve member, as shown in FIG. 3). Actuators 112 and 126 may be electronic actuators configured to operate valves 110 and 120 in response to a control signal received from an electronic controller 130. In other embodiments, actuators 112 and 126 may be manual actuators (e.g., manually operable handles, wheels, etc.) or other devices for controlling a rotational position of valves 110 and 120.

Fluid system 100 is shown to further include fluid pumps 106 and 108. Pump 106 may be fluidly connected with first fluid supply 102 and pump 108 may be fluidly connected with second fluid supply 104. Pumps 106 and 108 may work to maintain fluid supplies 102 and 104 at a particular state or condition (e.g., a particular fluid pressure, flow rate, etc.). Pumps 106 and 108 may be operated by controller 130 (e.g., in response to a control signal received from controller 130), by a separate controller, or in response to a power signal or control signal received from any other source.

Controller 130 may be configured to operate actuators 112 and 126 to regulate fluid flow through fluid system 100. In some embodiments, controller 130 is configured to select either first fluid supply 102 or second fluid supply 104 to deliver to fan coil unit 116. Controller 130 may be configured to modulate a flow rate of fluid supply 102 and 104 by adjusting a rotational position of valve 110 (e.g., via actuator 112). Controller 130 may be configured to direct the fluid output by fan coil unit 116 to either first fluid return 122 or second fluid return 124 and to control a flow rate of the return fluid by adjusting a rotational position of valve 120 (e.g., via actuator 126).

In some embodiments, controller 130 is a feedback controller configured to receive feedback signals from various sensors (e.g., temperature sensors, pressure sensors, flow rate sensors, position sensors, etc.). The sensors may be arranged to measure a flow rate, temperature, pressure, or other state or condition at various locations within fluid system 100. Controller 130 may operate actuators 112, 126, and/or pumps 106-108 to achieve a setpoint for any variable state or condition measured or calculated from measured variables. An exemplary controller that may be used for controller 130 is described in greater detail with reference to FIG. 10.

Figure 2:
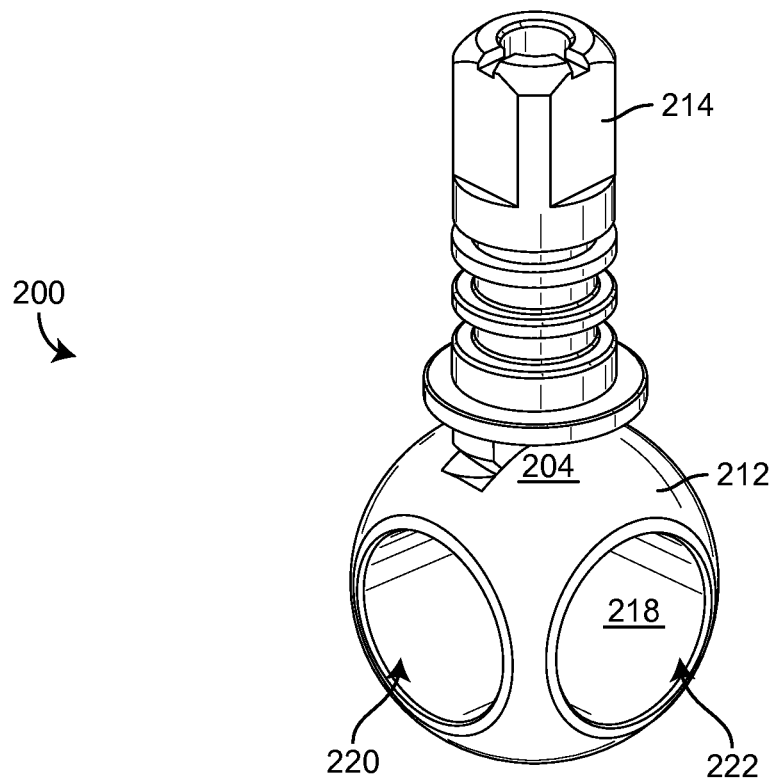
FIG. 2 is an exploded view drawing illustrating the valve of FIG. 1 in greater detail, according to an exemplary embodiment.
Figure 2:
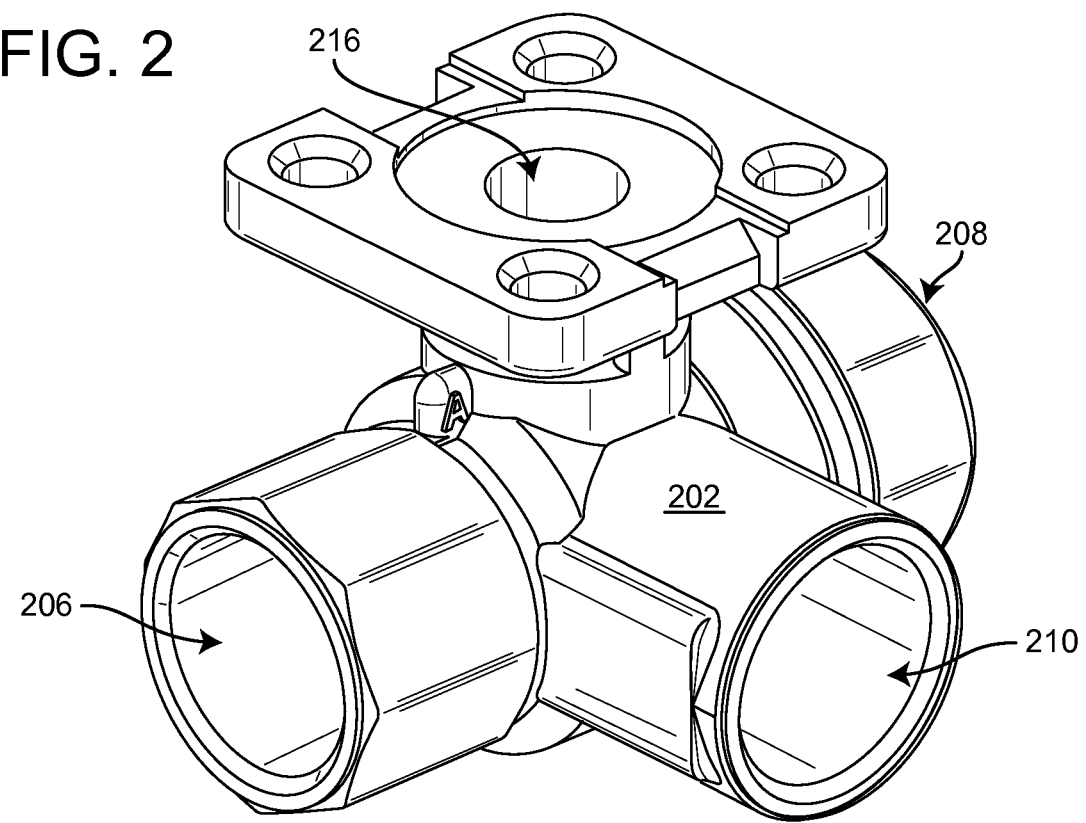

Referring now to FIG. 2, an exploded view drawing of a fluid control valve 200 is shown, according to an exemplary embodiment. Valve 200 may be used as either or both of valves 110 and 120 in FIG. 1. Valve 200 is shown to include a valve body 202 and a valve member 204. Valve body 202 may include an internal valve chamber and a plurality of ports 206-210 into the valve chamber. For example, valve body 202 is shown to include a first port 206, a second port 208, and a third port 210. As shown, first port 206 and second port 208 may be inline ports (e.g., aligned with a common axis) and may be located on opposite sides of the valve chamber. In various embodiments, first port 206 and second port 208 may be located at a variety of different angles relative to each other (e.g., 180 degrees, 120 degrees, etc.). Third port 210 may be a transverse port (i.e., not inline with ports 206 and 208). As shown, third port 210 is substantially perpendicular to ports 206 and 208 and in the same plane as ports 206 and 208. In other embodiments, third port 210 may be oriented at a variety of different angles relative to ports 206 and 208 and may not be in the same plane as ports 206 and 208.

In some embodiments, valve body 202 is a three-way valve body having three ports (e.g., ports 206-210). A three-way valve body may be used to switch between either two fluid supplies or two fluid returns. For example, valve body 202 may be configured to receive a first fluid supply (e.g., fluid supply 102) at first port 206 and a second fluid supply (e.g., fluid supply 104) at second port 208. Valve body 202 may switch between the first fluid supply and the second fluid supply by selectively directing either the first fluid supply or the second fluid supply through the internal valve chamber and out third port 210. By controllably rotating valve member 204 within valve chamber, fluid control valve 200 can modulate a flow rate of the first fluid supply and/or the second fluid supply.

In some embodiments, valve body 202 may be configured to receive a fluid return at third port 210 (e.g., a return fluid output by fan coil unit 116). Valve body 202 may selectively deliver the fluid return to either first port 206 or second port 208 by rotating valve member 204.

In some embodiments, valve body 202 is a six-way valve body having six ports. A six-way valve body may combine two three-way valve bodies. For example, a second three-way valve body may be stacked above or below the three-way valve body shown in FIG. 2. A six-way valve body may be used to switch between both two fluid supplies and two fluid returns. The six-way valve body may use two separate valve members (e.g., for independently switching fluid supplies and fluid returns) or a shared valve member (e.g., for switching fluid supplies and fluid returns in unison). Advantageously, a six-way valve body may be controlled by a single actuator acting upon a single valve member. An exemplary six way valve body is described in greater detail with reference to FIG. 3.

In various embodiments, the plurality of ports 206-210 may include any number of ports (e.g., two ports, three ports, four ports, six ports, twenty ports, etc.). Ports 206-210 may be configured to connect to pipes, tubes, or other fluid control components. Ports 206-210 may be configured to connect with fluid pipelines using threadings, compression fittings, glue, cement, flanges, welding, or other fasteners.

In some embodiments, the plurality of ports 206-210 are full size ports. A full size port may be defined as a port having a size that is greater than or equal to the size of the fluid pipeline connecting to the port. For example, if the pipeline connecting to a port has an internal diameter of two inches, the port may qualify as a full size port if the diameter of the port is at least two inches. In various embodiments, other size metrics (e.g., cross-sectional area, radius, circumference, etc.) may be used to quantify the size of fluid pipelines and/or ports. Advantageously, full size ports may result in improved flow rates (e.g., a higher maximum flow rate through valve 200), reduced friction losses, and reduced pressure drops relative to reduced size ports.

Valve body 202 may be made from any of a variety of materials including, for example, metals (e.g., cast iron, brass, bronze, steel, stainless steel, aluminum, etc.), plastics (e.g., PVC, PP, HDPE, etc.), glass-reinforced polymers (e.g., fiberglass), ceramics, or any combination thereof. The material or materials used to form valve body 202 may be based on the application for which valve body 202 is intended. For example, corrosion-resistant materials may be used for implementations in which valve body 202 is used with corrosive fluids (e.g., salt water, acidic fluids, etc.).

Still referring to FIG. 2, valve 200 is shown to include a valve member 204. In operation, valve member 204 may be located at least partially within the internal valve chamber. Valve member 204 may be controllably movable (e.g., in rotation, in linear movement, etc.) relative to valve body 202 to modulate fluid flow through valve 200. In some embodiments valve member 204 is configured to rotate by approximately 270 degrees relative to valve body 202. By rotating valve member 204, fluid flow can be selectively controlled (e.g., diverted, adjusted, increased, decreased, etc.) between the plurality of ports 206-210.

Valve member 204 is shown to include a disc 212 and a valve stem 214. In some embodiments, disc 212 is a substantially spherical ball and may characterize valve 200 as a ball valve. In other embodiments, disc 212 may be a cylinder (e.g., in a plug valve), a plate (e.g., in a butterfly valve), or have any other geometry or shape. Disc 212 may be located within valve 200 (e.g., within the internal valve chamber connecting ports 206-210) and may be controllably rotated to regulate fluid flow through valve 200.

In various embodiments, disc 212 may be fixedly attached to valve stem 214 or combined with valve stem 214 into a single component. Valve stem 214 may extend through valve body 202 (i.e., through hole 216) and connect to a handle or actuator for controlling the rotation of disc 212. In some embodiments, valve stem 214 connects multiple discs 212. For example, in a six-way valve, valve stem 214 may pass through valve body 202 and into another valve body. Valve stem 214 may be rotated (e.g., by a handle, by an automatic actuator, etc.) to adjust the rotational position of one or more discs 212.

Still referring to FIG. 2, disc 212 is shown to include a passage 218 therethrough. In some embodiments, passage 218 is L-shaped (e.g., having two openings and a single ninety degree bend). Passage 218 may be formed by drilling two bores into disc 212 at approximately 90 degrees relative to each other. The two bores may connect within disc 212 to form passage 218. In other embodiments, passage 218 may be T-shaped (e.g., having a main bore straight through disc 212 and a second bore extending perpendicularly from one side of the main bore), X-shaped (e.g., having two bores extending through disc 212 and intersecting at a ninety degree angle), or have any other shape.

Passage 218 may be controllably aligned (e.g., partially aligned, fully aligned, etc.) with ports 206-210 to form a fluid connection between pairs of ports. For example, passage 218 may be rotated into alignment with either first port 206 and third port 210, or second port 208 and third port 210. A port may be characterized as open (e.g., partially open, fully open, etc.) if one of the openings 220 or 222 into passage 218 aligns (i.e., overlaps) at least partially with the port. Conversely, a port may be characterized as completely closed if none of the openings 220 or 222 into passage 218 align at least partially with the port.

In some embodiments, passage 218 is a full-bore passage. A full-bore passage may be defined as a passage having a size (e.g., diameter, radius, cross-sectional area, etc.) that is at least the same size as the pipeline connecting to valve 200. A full-bore passage provides several advantages over a reduced-bore passage (i.e., a passage in which the size of the passage is less than the size of the pipeline connecting to the valve). For example, a full-bore passage may not restrict flow, thereby resulting in an improved flow rate potential (e.g., a faster maximum flow rate) and lower friction losses relative to a reduced-bore passage. Advantageously, fluid control valve 200 may include both a plurality of full-size ports 206-210 and a full-bore passage 218 (without a corresponding increase in valve size).

In some embodiments, the bore size of passage 218 (e.g., bore diameter) may be sufficiently large to span a distance between the plurality of ports 206-210. A single opening into passage 218 (i.e., either opening 220 or opening 222) may be capable of simultaneously overlapping at least partially with two or more of ports 206-210. For example, in FIG. 2, valve member 204 is shown with passage 218 aligned with ports 206 and 210. If valve member 204 were rotated by 90 degrees to move passage 218 out of alignment with ports 206 and 210 and into alignment with ports 208 and 210 (i.e., 90 degrees counterclockwise from a top down perspective), valve member 204 would rotate through a position (e.g., approximately halfway through the 90 degree rotation) in which openings 220 and 222 would simultaneously overlap with all three ports 206-210. For example, opening 220 would simultaneously overlap with both ports 206 and 210 and opening 222 would simultaneously overlap with both ports 208 and 210.

A simultaneous overlap between all three ports 206-210 may cause mixing to occur. For example, if all three ports 206-210 were at least partially open simultaneously, fluid from port 206 could mix with fluid from port 208 within passage 218 and exit valve body 202 through port 210. Conventional three-way valves typically include reduced-size ports and/or a reduced-bore passage in order to prevent such a simultaneous overlap from occurring.

Advantageously, fluid control valve 200 can be operated to prevent fluid mixing from occurring without reducing the size of ports 206-210 or the size of passage 218. For example, rather than rotating valve member 204 by 90 degrees as described above, valve member 204 can be rotated by 270 degrees in the opposite direction (e.g., 270 degrees clockwise from a top down perspective). The 270 degree backward rotation results in valve member 204 ending in the same rotational position as if valve member 204 were rotated forward by 90 degrees. However, the 270 degree backward rotation does not cause valve member 204 to rotate through any position in which all three ports 206-210 are at least partially open simultaneously.

In some embodiments, mixing may occur between ports 206 and 208 when valve member 204 is rotated approximately half way through the 270 degree rotation (e.g., by approximately 135 degrees). However, at the 135 degree rotational position, port 210 is maintained completely closed and any mixed fluid is prevented from exiting valve body 202 via port 210. The window for mixing is very small (e.g., a small window around the 135 degree rotational position) compared to traditional three-way valves and does not occur during a flow modulation portion of the rotation (e.g., between 0 and 90 degrees or between 180 and 270 degrees). For implementations in which the pressures of the fluids at ports 206 and 208 are balanced, the opportunity for mixing is further minimized.

In FIG. 2, the primary components of valve 200 are shown (i.e., valve body 202 and valve member 204). In some embodiments, valve 200 includes one or more additional components not explicitly shown in FIG. 2. For example, valve 200 may include gaskets, o-rings, seals, or other types of packing to prevent fluid leakage. In some embodiments, valve 200 includes a soft seat (e.g., a fitting within valve body 202 made from a relatively soft material such as a plastics or elastomers) to interface between valve body 202 and valve member 204. In some embodiments, valve 200 includes a spring to bias valve member 204 toward a particular rotational position. Valve 200 may include any number or type of additional trim and/or packing components as may be suitable for various implementations. These or other additional components added to valve 200 may reduce or eliminate the opportunity for fluid mixing at the 135 degree rotational position.

Referring now to FIG. 3, a drawing of a six-way valve 300 is shown, according to an exemplary embodiment. Six-way valve 300 is shown to include a six-way valve body 302 and a valve member 304. Six-way valve body 302 may combine two three-way valve bodies (e.g., valve body 202) in a stacked orientation. In the stacked orientation, a single valve member 304 can be used to control fluid flow through both of the three-way valve bodies. Advantageously, six-way valve body 300 may be controlled by a single actuator acting upon valve member 304.

Six-way valve 300 may be used to switch between both two fluid supplies and two fluid returns. For example, six-way valve 300 may be configured to receive first fluid supply 102 at first supply port 306 and to receive second fluid supply 104 at second supply port 308. Valve member 304 may be rotated by 270 degrees to selectively control fluid flow from either first supply port 306 or second supply port 308 to outlet port 310 (e.g., without mixing). Outlet port 310 may connect to fan coil unit 116 (e.g., via coil supply line 114). The fluid from outlet port 310 may pass through fan coil unit 116 and return to valve 300 at return port 312. Valve member 304 may be rotated by 270 degrees to selectively divert fluid from return port 312 to either first return port 314 or second return port 316. Return ports 314 and 316 may be fluidly connected to returns 122 and 124, respectively.

Referring now to FIGS. 4-7, four cross-sectional drawings of a fluid control valve are shown, according to an exemplary embodiment. The cross-sectional drawings may be cross-sections of a three-way fluid control valve (e.g., valve 200, as shown) or cross-sections of a six-way fluid control valve (e.g., valve 300). FIGS. 4-7 illustrate valve 200 with valve member 204 at various stages of a 270 degree rotation. By rotating valve member 204 by approximately 270 degrees between a first end position (shown in FIG. 4) and a second end position (shown in FIG. 7), valve 200 can modulate the flow of a first fluid between ports 206 and 210 and the flow of a second fluid between ports 208 and 210.

In various embodiments, the first fluid and the second fluid are the same fluid (e.g., hot water and cold water, etc.) or different fluids (e.g., different types of coolant, different types of refrigerant, etc.). In other embodiments, port 210 receives a single fluid that is selectively diverted to either port 206 or port 208. As used herein, the term "first fluid" identifies a fluid flow between ports 206 and 210, and the term "second fluid" identifies a fluid flow between ports 208 and 210.

Figure 4:
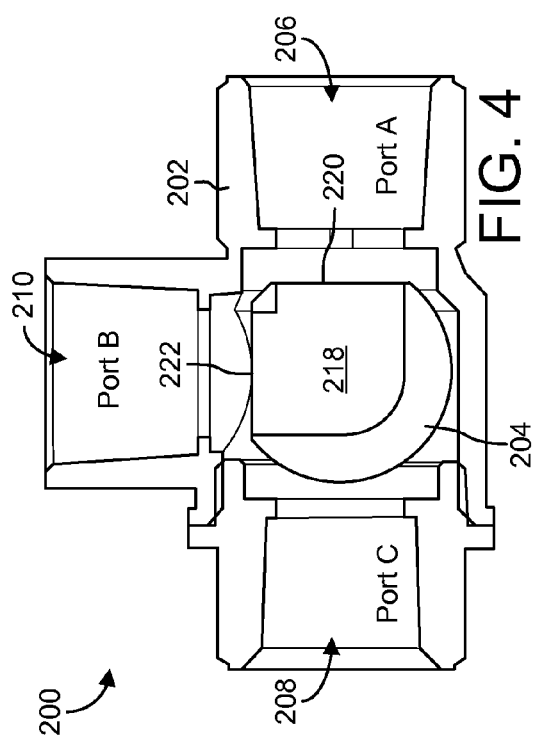
FIGS. 4-7 are cross-sectional drawings of the valve of FIG. 2, showing the valve member at various rotational positions of a 270 degree rotation, according to an exemplary embodiment.

Referring specifically to FIG. 4, valve member 204 is shown in a first end position. In the first end position, openings 220 and 222 into passage 218 may be completely aligned (i.e., at maximum overlap) with ports 206 and 210, respectively. In the first end position, ports 206 and 210 may be completely open and port 208 may be completely closed.

In the first end position, passage 218 forms a fluid connection between ports 206 and 210. The fluid connection between ports 206 and 210 allows a first fluid to flow therebetween (e.g., from port 206 to port 210 and/or from port 210 to port 206). When valve member 204 is in the first end position, the flow rate of the first fluid through valve body 202 may be at a maximum due to the maximum overlap of ports 206 and 210 with openings 220 and 222.

Figure 5:
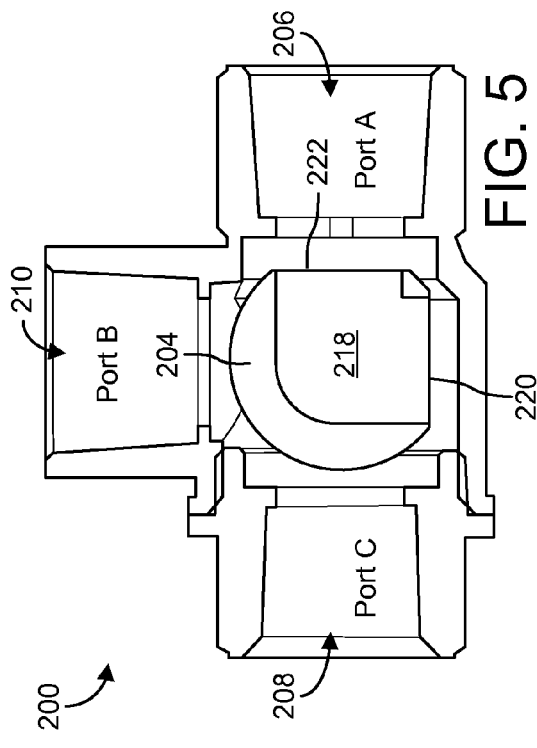

Referring now to FIG. 5, valve member 204 is shown in a first intermediate position. In some embodiments, the first intermediate position is approximately 90 degrees from the first end position (e.g., 90 degrees into the 270 degree rotation). Valve member 204 may be rotated into the first intermediate position by applying a torque to valve stem 214. For example, valve stem 214 may be attached to a user-operable handle or an automatic actuator (e.g., operable by a controller). The handle or actuator may be operated (i.e., rotated) to cause valve member 204 to rotate into the first intermediate position.

In the first intermediate position, opening 222 may be completely aligned with port 206 (i.e., at maximum overlap with port 206). However, as shown in FIG. 5, opening 220 may not be aligned completely or partially with any of ports 206-210. In the first intermediate position, port 206 may be completely open and ports 208-210 may be completely closed. When only one port is at least partially open, no flow occurs through valve body 202. Accordingly, no flow may occur through valve body 202 when valve member 204 is in the first intermediate position.

Valve 200 may be configured to modulate the flow rate of the first fluid (i.e., fluid flow between ports 206 and 210) by rotating valve member 204 between the first end position (shown in FIG. 4) and the first intermediate position (shown in FIG. 5). For example, when valve member 204 is rotated from the first end position into the first intermediate position (e.g., 90 degrees clockwise, from FIG. 4 to FIG. 5), the flow rate of the first fluid may be reduced from a maximum flow rate in the first end position to a zero flow rate in the first intermediate position. When valve member 204 is rotated from the first intermediate position into the first end position (e.g., 90 degrees counter-clockwise, from FIG. 5 to FIG. 4), the flow rate of the first fluid may be increased from a zero flow rate in the first intermediate position to a maximum flow rate in the first end position.

Advantageously, as valve member 204 is rotated between the first end position and the first intermediate position, port 208 may be maintained in a completely closed state. By maintaining port 208 in a completely closed state, the flow rate of the first fluid may be modulated (e.g., increased, decreased, adjusted, etc.) without forming a fluid connection between ports 208 and 210. The lack of a fluid connection between ports 208 and 210 prevents fluid flow between ports 208 and 210, thereby eliminating the potential for mixing.

Figure 6:
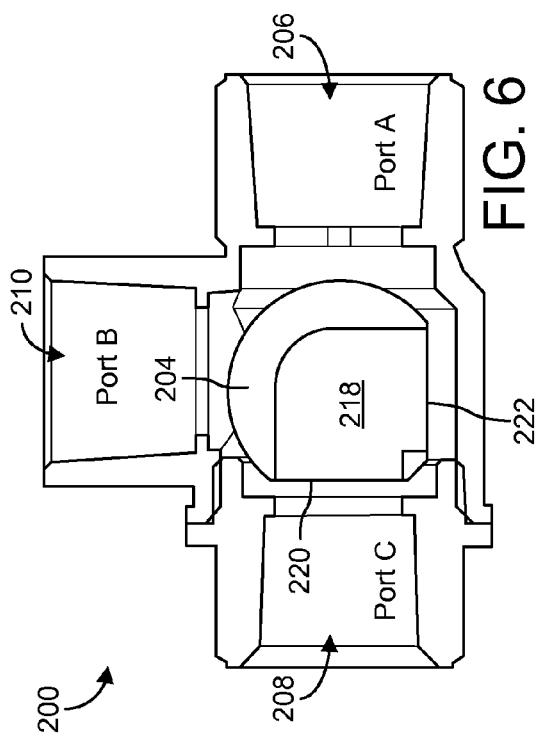

Referring now to FIG. 6, valve member 204 is shown in a second intermediate position. In some embodiments, the second intermediate position is approximately 90 degrees from the first intermediate position and approximately 180 degrees from the first end position. Valve member 204 may be rotated into the second intermediate position by continuing to rotate valve member 204 in the same direction (e.g., clockwise in FIGS. 4-7) by approximately 90 degrees past the first intermediate position.

In the second intermediate position, opening 220 may be completely aligned with port 208. However, as shown in FIG. 6, opening 222 may not be aligned completely or partially with any of ports 206-210. In the second intermediate position, port 208 may be completely open and ports 206 and 210 may be completely closed. Accordingly, no flow may occur through valve body 202 when valve member 204 is in the second intermediate position. In some embodiments, both ports 206 and 208 are at least partially open during a transition between the first intermediate position and the second intermediate position.

Advantageously, as valve member 204 is rotated between the first intermediate position (shown in FIG. 5) and the second intermediate position (shown in FIG. 6), port 210 may be maintained in a completely closed state. By maintaining port 210 in a completely closed state, fluid is prevented from exiting valve body 202 (e.g., for implementations in which ports 206 and 208 are connected to fluid supplies 102 and 104, respectively) or entering valve body 202 (e.g., for implementations in which ports 206 and 208 are connected to fluid returns 122 and 124, respectively). As valve member 204 is rotated between the first intermediate position and the second position, no flow may occur through valve body 202 via port 210.

Figure 7:
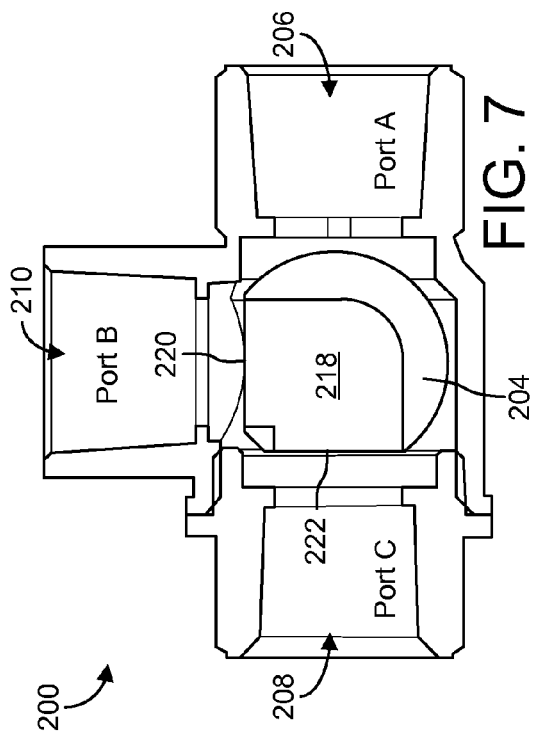

Referring now to FIG. 7, valve member 204 is shown in a second end position. In some embodiments, the second end position is approximately 90 degrees from the second intermediate position and approximately 270 degrees from the first end position. Valve member 204 may be rotated into the second end position by continuing to rotate valve member 204 in the same direction (e.g., clockwise in FIGS. 4-7) by approximately 90 degrees past the second intermediate position.

In the second end position, openings 220 and 222 into passage 218 may be completely aligned (i.e., at maximum overlap) with ports 210 and 208, respectively. In the second end position, ports 208 and 210 may be completely open and port 206 may be completely closed. In the second end position, passage 218 forms a fluid connection between ports 208 and 210. The fluid connection between ports 208 and 210 allows a second fluid to flow therebetween (e.g., from port 208 to port 210 and/or from port 210 to port 208).

When valve member 204 is in the second end position, the flow rate of the second fluid through valve body 202 may be at a maximum due to the maximum overlap of ports 208 and 210 with openings 222 and 220, respectively.

Valve 200 may be configured to modulate the flow rate of the second fluid by rotating valve member 204 between the second end position and the second intermediate position. For example, when valve member 204 is rotated from the second intermediate position into the second end position (e.g., 90 degrees clockwise, from FIG. 6 to FIG. 7), the flow rate of the second fluid may be increased from a zero flow rate in the second intermediate position to a maximum flow rate in the second end position. When valve member 204 is rotated from the second end position into the second intermediate position (e.g., 90 degrees counter-clockwise, from FIG. 7 to FIG. 6), the flow rate of the first fluid may be decreased from a maximum flow rate in the second end position to a zero flow rate in the second intermediate position.

Advantageously, as valve member 204 is rotated between the second intermediate position to the second end position, port 206 may be maintained in a completely closed state. By maintaining port 206 in a completely closed state, the flow rate of the second fluid may be modulated (e.g., increased, decreased, adjusted, etc.) without forming a fluid connection between ports 206 and 210. The lack of a fluid connection between ports 206 and 210 prevents fluid flow between ports 206 and 210, thereby eliminating the potential for mixing the first fluid and the second fluid.

In some embodiments, valve member 204 includes one or more stops defining a rotational range for valve member 204. The stops may permit valve member 204 to rotate only within a set rotational range. The ends of the rotational range may define the first end position and the second end position. In some embodiments, the stops are separated by approximately 270 degrees, thereby permitting valve member 204 to rotate by approximately 270 degrees between the first end position and the second position. In other embodiments, the first end position and the second end position may be separated by a greater or lesser number of degrees (e.g., 120 degrees, 180 degrees, 300 degrees, 315 degrees, etc.).

In some embodiments, valve member 204 does not include stops. Without stops, valve member 204 may be capable of rotating within valve body 202 by a full 360 degrees and/or indefinitely. In some embodiments, the rotational range for valve member 204 is defined by an external handle or actuator. For example, valve stem 214 may be connected to a user-operable handle (e.g., a lever, a wheel, etc.) for manually controlling the rotation of valve member 204 from outside valve body 202. The handle may include stops defining the rotational range of valve member 204.

In some embodiments, valve stem 214 is coupled to an actuator (e.g., actuator 112 or actuator 126) for automatically controlling the rotation of valve member 204. The actuator may be configured to rotate valve member 204 by approximately 270 degrees between the first end position and the second position. The actuator may be partially or completely automated and may be operated locally or remotely. In some embodiments, the actuator receives a control signal from a controller (e.g., controller 130) and operates valve 200 in response to the control signal received from the controller.

Figure 8:
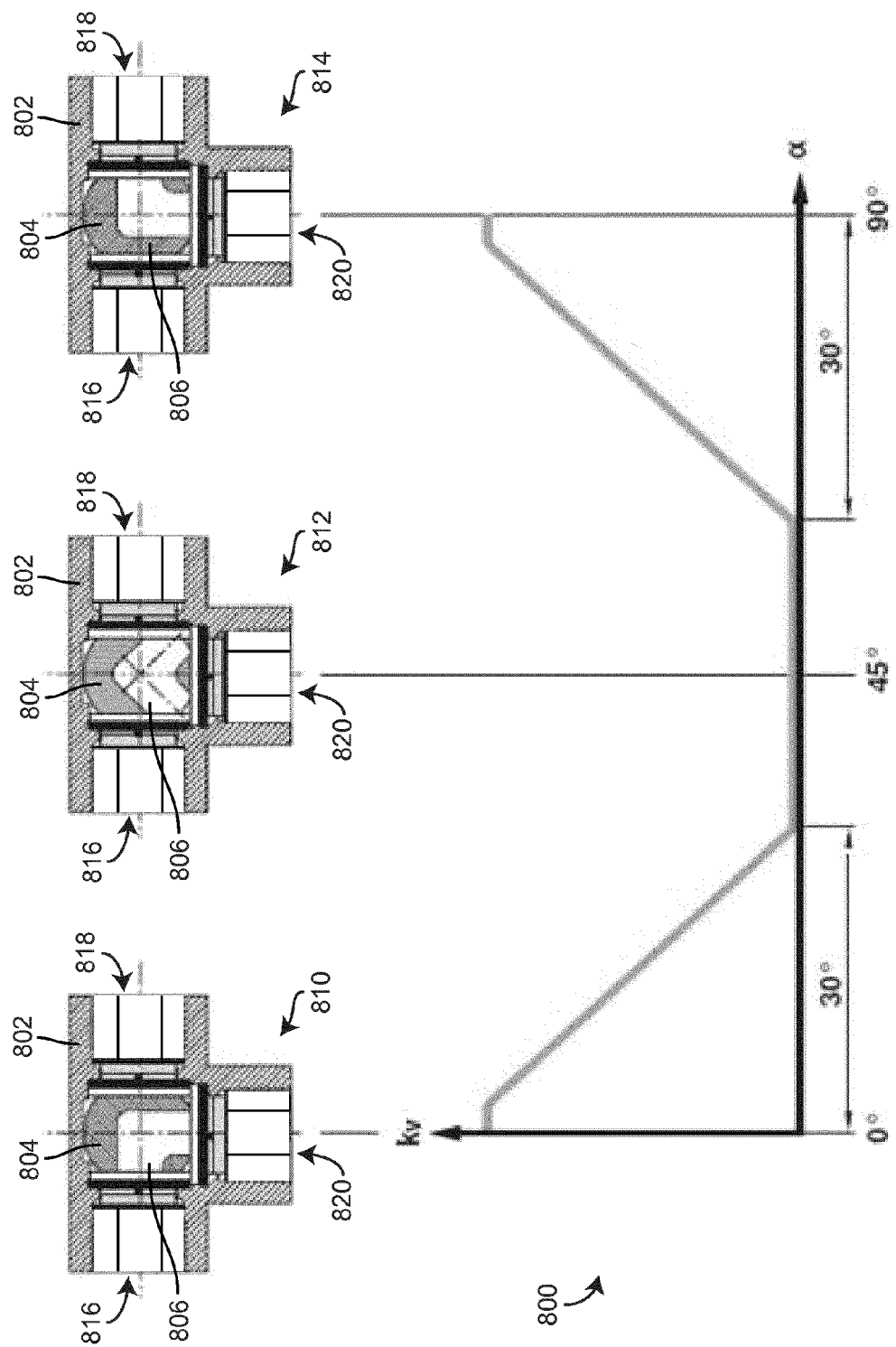
FIG. 8 is a flow diagram illustrating the flow control capability of a conventional valve assembly in which the valve member is rotated by only 90 degrees, according to an exemplary embodiment.
Figure 9:
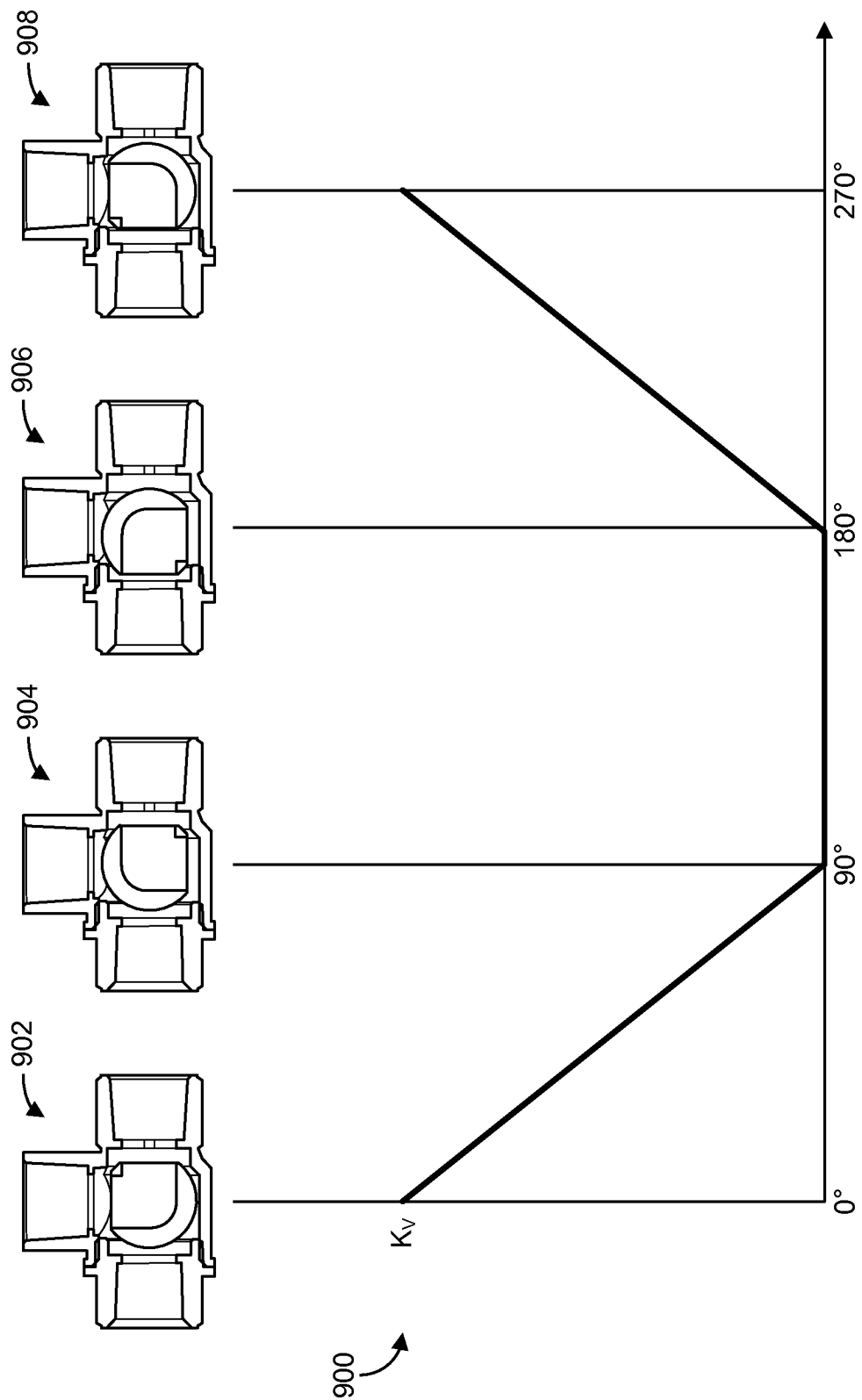
FIG. 9 is a flow diagram illustrating the improved flow control capability provided by the valve of FIG. 2 in which the valve member is rotated by 270 degrees, according to an exemplary embodiment.

Referring now to FIGS. 8-9 a pair of flow diagrams 800 and 900 are shown, according to an exemplary embodiment. Referring specifically to FIG. 8, flow diagram 800 illustrates the flow control ability of a conventional fluid control valve 802. Valve 802 is operated by rotating valve member 804 by 90 degrees between a first end position 810 and a second end position 814.

In order to prevent mixing from occurring, passage 806 through valve member 804 has a reduced bore size relative to the size of the fluid pipelines connecting to valve 802. The reduced bore size prevents fluid mixing when valve member 804 is in an intermediate position 812 between first end position 810 and second end position 814. However, the reduced bore size increases friction losses and requires a greater upstream pressure to cause fluid flow through valve 802.

Still referring to FIG. 8, fluid flow through valve 802 can be controlled by rotating valve member 804 by a total of 90 degrees. Fluid flow between ports 816 and 820 is controlled by rotating valve member 804 approximately 30 degrees from first end position 810 toward intermediate position 812. Fluid flow between ports 818 and 820 is controlled by rotating valve member 804 by approximately 30 degrees from second end position 814. With valve 802, fluid flow can be adjusted between a maximum flow rate (i.e., at end positions 810 and 814) and a zero flow rate, by rotating valve member 804 by 30 degrees. The 30 degree separation between maximum and minimum flow causes a relatively small rotation of valve member 804 to result in a relatively large change in flow rate. It may be difficult to achieve a desired flow rate with valve 802 due to the relatively large change in flow rate resulting from a small rotation of valve member 804.

Referring specifically to FIG. 9, flow diagram 900 illustrates the improved flow control ability provided by fluid control valve 200. Valve 200 is operated by rotating valve member 204 by 270 degrees between a first end position 902 and a second end position 908. First end position 902 may correspond to the position shown in FIG. 4 and second end position 904 may correspond to the position shown in FIG. 7. Fluid flow between ports 206 and 210 can be controlled by rotating valve member 204 by approximately 90 degrees between first end position 902 and first intermediate position 904. First intermediate position 904 may correspond to the position shown in FIG. 5. Fluid flow between ports 208 and 210 can be controlled by rotating valve member 204 by approximately 90 degrees between second end position 908 and second intermediate position 906. Second intermediate position 906 may correspond to the position shown in FIG. 6.

Advantageously, the 90 degree separation between maximum flow rate (i.e., at end positions 902 and 908) and zero flow (i.e., at intermediate positions 904 and 906) allows for a more gradual change in flow rate, relative to conventional valve 802. It may be easier to achieve a desired flow rate with valve 200 due to the relatively large separation (e.g., 90 degrees) between maximum and minimum flow. With valve 200, a desired flow rate can be achieved more accurately and precisely than with conventional valve 802. For example, a control system for valve 200 can tolerate a greater variation in actuator position while maintaining the flow rate through valve 200 within an acceptable (e.g., setpoint) range. This greater tolerance in actuator position allows less accurate and less expensive actuators to be used without sacrificing flow control precision.

Figure 10:
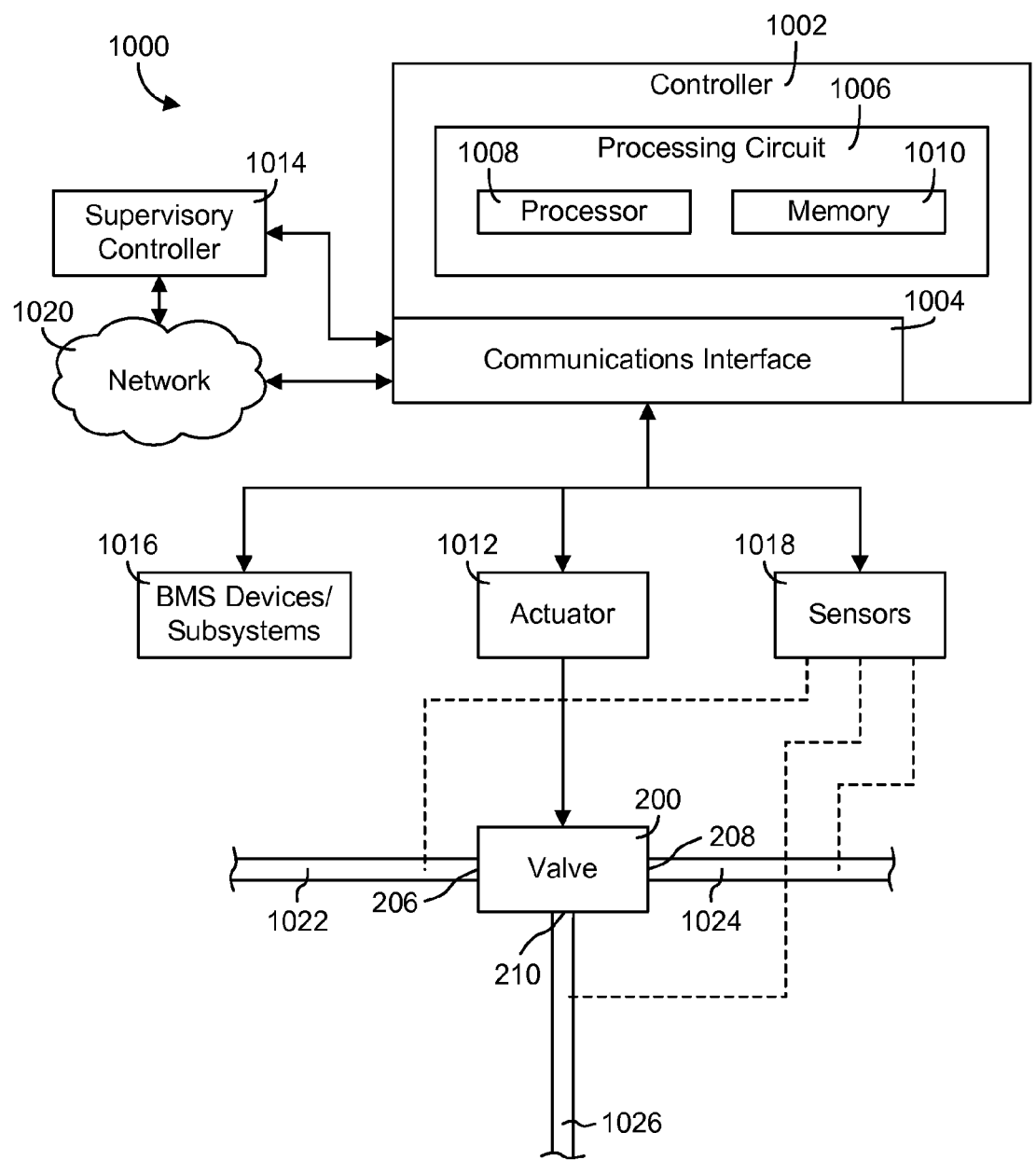
FIG. 10 is a block diagram of a control system configured to operate the valve of FIG. 2, according to an exemplary embodiment.

Referring now to FIG. 10, a block diagram of a control system 1000 is shown, according to an exemplary embodiment. Control system 1000 may be used to monitor and control any number of conditions, states, or variables of a controlled system (e.g., a building system, a plumbing system, a HVAC system, etc.) including, for example, the rotational position of fluid control valve 200.

In some embodiments, control system 1000 is a local control system (e.g., local to a building, building zone, building system, etc.). In other embodiments, control system 1000 is a distributed or remote control system. Control system 1000 may be used to control a single device (e.g., valve 200) or a plurality of devices (e.g., a chiller, boiler, air handling unit, damper, etc.). The plurality of devices may be located within a single building or building system or spread throughout several buildings or discrete building systems. In some embodiments, control system 1000 is part of a comprehensive building automation system such as a METASYS® brand building automation system sold by Johnson Controls, Inc. In other embodiments, control system 1000 is a local control system for one or more valves and/or other HVAC devices.

Control system 1000 is shown to include a controller 1002 having a communications interface 1004 and a processing circuit 1006. Communications interface 1004 may include wired or wireless interfaces (e.g., jacks, antennas, transmitters, receivers, transceivers, wire terminals, etc.) for conducting data communications with, for example, actuator 1012, supervisory controller 1014, BMS devices/subsystems 1016, sensors 1018, or other external devices or data sources. Data communications may be conducted via a direct connection (e.g., a wired connection, an ad-hoc wireless connection, etc.) or via a communications network 1020 (e.g., an Internet connection, a LAN, WAN, or WLAN connection, etc.).

Communications interface 1004 may be configured to receive control signals from a supervisory controller 1014 (e.g., specific operating instructions, setpoint instructions, etc), measurement signals from sensors 1018, and/or other types of electronic data communications from various building management system (BMS) devices or subsystems 1016. For example, communications interface 1004 may receive measurement signals from sensors 1018 indicating a state or condition (e.g., temperature, pressure, flow rate, etc.) of the fluids in pipelines 1022-1026. As shown in FIG. 10, pipelines 1022, 1024, and 1026 may connect to ports 206, 208, and 210, respectively.

Still referring to FIG. 10, controller 1002 is shown to include a processing circuit 1006 having a processor 1008 and memory 1010. Processor 1008 can be implemented as a general purpose processor, an application specific integrated circuit (ASIC), one or more field programmable gate arrays (FPGAs), a group of processing components, or other suitable electronic processing components.

Memory 1010 (e.g., memory device, memory unit, storage device, etc.) may include one or more devices (e.g., RAM, ROM, Flash memory, hard disk storage, etc.) for storing data and/or computer code for completing or facilitating the various processes, layers and modules described herein. Memory 1010 may include volatile memory or non-volatile memory. Memory 1010 may include database components, object code components, script components, or any other type of information structure for supporting the various activities and information structures described herein.

In some embodiments, controller 1002 is a feedback loop controller (e.g., a proportional gain controller, a proportional-integral (PI) controller, a proportional-integral-derivative (PID) controller, and adaptive gain controller, a pattern recognition adaptive controller (PRAC), a model predictive controller, etc.) Controller 1002 may be configured to monitor the fluids in pipelines 1022-1026 (e.g., using measurement signals received from sensors 1018). Controller 1002 may use the signals from sensors 1018 to operate fluid control valve 200 and to achieve a desired setpoint. For example, controller 1002 may be configured to operate fluid control valve 200 to achieve a temperature setpoint, a pressure setpoint, a flow rate setpoint, or any other type of setpoint received from supervisory controller 1014 or from a user device (e.g., via network 1020).

Controller 1002 may be configured automatically operate fluid control valve 200 using an actuator 1012. Actuator 1012 may be rotatably coupled to valve stem 214 and configured to cause valve member 204 to rotate (e.g., by acting upon valve stem 214). Actuator 1012 may be any type of mechanism capable of acting upon valve 200 to cause a rotation of valve member 204. For example, actuator 1012 may include an electric motor that is operable in response to a control signal from controller 1002 to cause a rotation of valve member 204. Actuator 1012 may be used as one or both of actuators 112 and 126 shown in FIG. 1.

Actuator 1012 may be configured to controllably rotate valve member 204 by approximately 270 degrees. As described with reference to FIG. 9, rotating valve member 204 by approximately 270 degrees may cause valve member 204 to rotate between the first end position 902 and the second end position 908. Controller 1002 may cause valve member 204 to rotate between the first end position 902 and the first intermediate position 904 to modulate fluid flow between port 206 and port 210 while maintaining port 208 completely closed. Controller 1002 may cause valve member 204 to rotate between the second end position 908 and the second intermediate position 906 to modulate fluid flow between port 208 and port 210 while maintaining port 206 completely closed.

Figure 11:
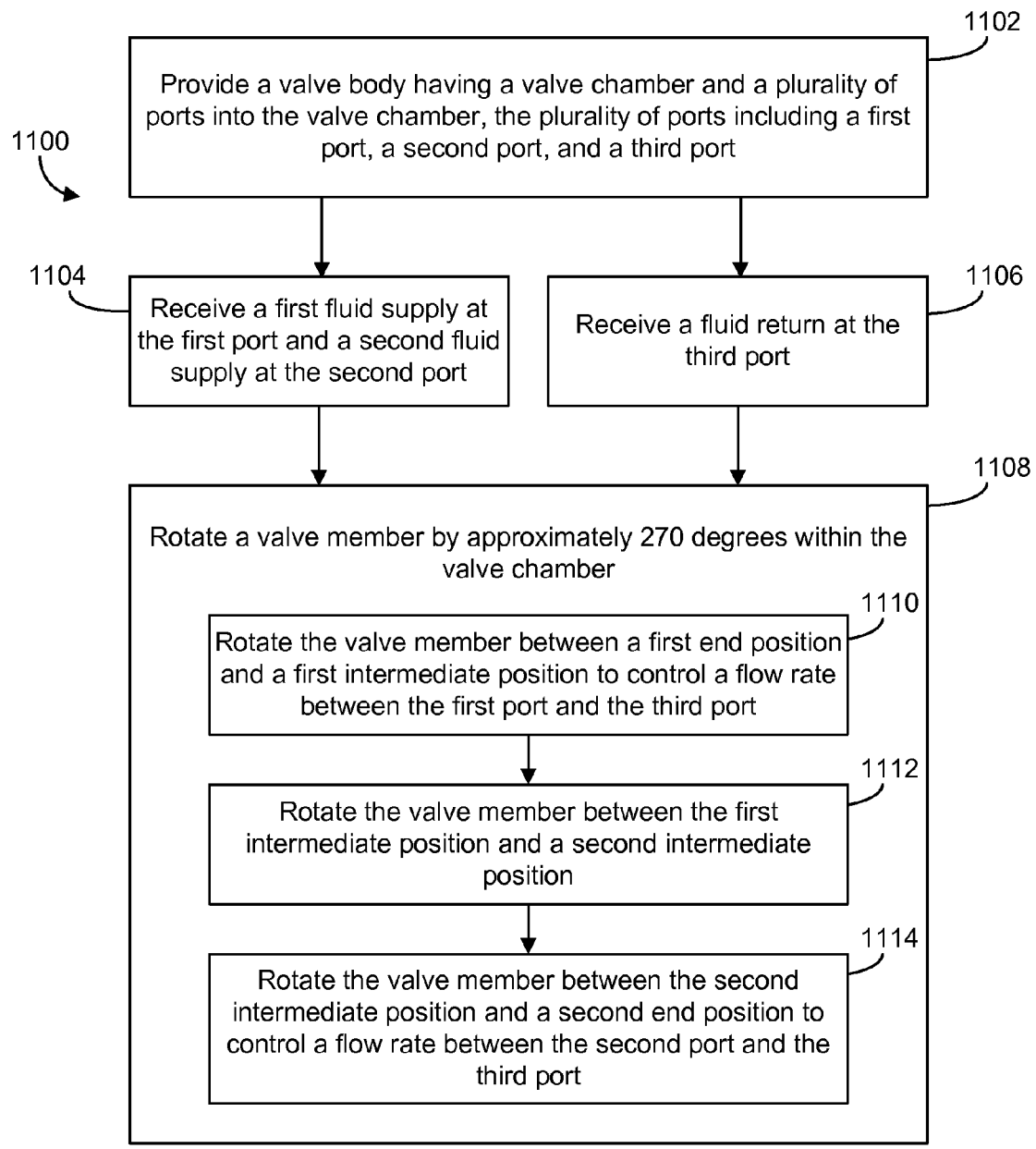
FIG. 11 is a flow chart of a process for controlling fluid flow using the 270 degree rotatable valve of FIG. 2, according to an exemplary embodiment.

Referring now to FIG. 11, a flowchart of a process 1100 for controlling fluid flow is shown, according to an exemplary embodiment. In some embodiments, process 100 is performed by control system 1000 using controller 1002, actuator 1012, and/or fluid control valve 200.

Process 1100 is shown to include providing a valve body having a valve chamber and a plurality of ports into the valve chamber (step 1102). The valve body may be a three-way valve body 202, a six-way valve body 302, or any other type of valve body. In some embodiments, the valve body is the same or similar to valve body 202, described in detail with reference to FIG. 2. For example, the valve body may include an internal valve chamber and a plurality of ports into the valve chamber. The plurality of ports may include a first port, a second port, and a third port. In some embodiments, the first port and the second port are aligned with a common axis and located on opposite sides of the valve chamber. In some embodiments, the third port is aligned with a second axis substantially perpendicular to the common axis. In some embodiments, the plurality of ports are full-size ports. For example, each of the plurality of ports may have a size (e.g., an area, a diameter, a radius, etc.) greater than or equal to the size of the fluid pipeline connecting to the port (i.e., a "full size" port).

Still referring to FIG. 11, process 1100 is shown to include receiving a first fluid supply at the first port and a second fluid supply at the second port (step 1104). Step 1104 may be performed for implementations in which process 1100 is used to switch between two fluid supplies (e.g., as valve 110, shown in FIG. 1). For example, the valve body may be configured to receive a first fluid supply (e.g., fluid supply 102) at the first port and a second fluid supply (e.g., fluid supply 104) at the second port. When the fluid control valve receives a first fluid supply at the first port and a second fluid supply at the second port, process 1100 may be performed to selectively direct one of the fluid supplies through the valve body and out the third port.

Process 1100 is shown to further include receiving a fluid return at the third port (step 1106). Step 1106 may be performed for implementations in which process 1100 is used to switch between two fluid returns (e.g., as valve 120, shown in FIG. 1). For example, the valve body may be configured to receive a return fluid at the third port (e.g., from coil return line 118). When the fluid control valve receives a return fluid at the third port, process 110 may be performed to selectively direct the return fluid to either the first port or the second port.

Still referring to FIG. 11, process 1100 is shown to include rotating a valve member by approximately 270 degrees within the valve chamber (step 1108). In some embodiments, the valve member is configured to rotate about an axis of rotation substantially perpendicular to both the common axis and the second axis. In some embodiments, the valve member includes a spherical disc component (i.e., a ball).

The valve member may include an L-shaped fluid passage extending through the ball. The fluid passage may be formed by drilling two bores in the ball at 90 degrees relative to each other. The two bores may meet in the middle of the ball to form the fluid passage. In some embodiments, the bore size of the fluid passage (e.g., bore diameter, bore area, etc.) may be sufficiently large to span a distance between the plurality of ports. For example, a single opening into the fluid passage may be large enough to simultaneously overlap with two or more of the plurality of ports. In some embodiments, the passage is a full-bore fluid passage having a bore size (e.g., bore diameter, bore cross-sectional area, etc.) greater than or equal to the size of the fluid pipelines connecting to the valve body.

In some embodiments, the valve member is rotatably coupled to an actuator. The actuator may be configured to perform step 1108 automatically in response to a control signal from a controller. The actuator may be designed to control the rotation of the valve member throughout the entire 270 degree rotational range. Conventional actuators typically rotate only 90 degrees and may require modification to be capable of performing step 1108. In some embodiments, the actuator is a specially designed actuator, customized to rotate 270 degrees.

Rotating the valve member by 270 degrees in step 1108 may allow the controller to independently modulate the flow rates of a first fluid (i.e., between the first port and the third port) and of a second fluid (i.e., between the second port and the third port). For example, modulating fluid flow between the first port and the third port may include regulating a flow rate of a first fluid supply to the third port. Modulating fluid flow between the second port and the third port may include regulating a flow rate of the second fluid supply to the third port.

In some embodiments, step 1108 includes rotating the valve member between a first end position in which the first port is fluidly connected with the third port and the second port is closed, and a second end position in which the second port is fluidly connected with the third port and the first port is closed. Rotating the valve member by approximately 270 degrees between the first end position and the second end position may include rotating the valve member through a first intermediate position approximately 90 degrees from the first end position and a second intermediate position approximately 90 degrees from the second end position. In some embodiments, when the valve member is in the first intermediate position and the second intermediate position, none of the plurality of ports are fluidly connected with one another.

Still referring to FIG. 11, step 1108 is shown to include a plurality of sub-steps 1110-1114. Each of steps 1110-1114 corresponds to a portion of the 270 degree rotation. For example, step 1108 is shown to include rotating the valve member between the first end position and the first intermediate position to control a flow rate between the first port and the third port (step 1110). In some embodiments, step 1110 is performed while maintaining the second port completely closed. Step 1110 may correspond to a first 90 degrees of the 270 degree rotation (e.g., a transition from the position shown in FIG. 4 to the position shown in FIG. 5). In step 1110, the valve member may be rotated by approximately 90 degrees to transition between a maximum flow rate of the first fluid (e.g., in the first end position) and a zero flow rate of the first fluid (e.g., in the first intermediate position).

Step 1108 is shown to further include rotating the valve member between the first intermediate position and the second intermediate position (step 1112). In some embodiments, step 1112 is performed while maintaining the third port completely closed. Step 1112 may correspond to a second 90 degrees of the 270 degree rotation (e.g., a transition from the position shown in FIG. 5 to the position shown in FIG. 6). In step 1112, the valve member may be rotated by approximately 90 degrees to transition between the first intermediate position and the second intermediate position. Throughout step 1112, no flow may occur through the valve body through the third port. Although both the first port and the second port may be at least partially open at rotational position approximately half way between the first end position and the second end position (e.g., approximately 135 degrees through the 270 degree rotation), the third port is maintained in a completely closed state, preventing fluid flow therethrough.

Step 1108 is shown to further include rotating the valve member between the second intermediate position and the second end position to control a flow rate between the second port and the third port (step 1114). In some embodiments, step 1114 is performed while maintaining the first port completely closed. Step 1114 may correspond to a third 90 degrees of the 270 degree rotation (e.g., a transition from the position shown in FIG. 6 to the position shown in FIG. 7). In step 1112, the valve member may be rotated by approximately 90 degrees to transition between a maximum flow rate of the second fluid (e.g., in the second end position) and a zero flow rate of the second fluid (e.g., in the second intermediate position).

Advantageously, regulating the flow rates may occur without mixing the first fluid and the second fluid. For example, the flow rate of the first fluid may be regulated by rotating the valve member between the first end position (i.e., a maximum flow position for the first fluid) and the first intermediate potion (i.e., a zero flow position) while maintaining the flow rate of the second fluid supply at zero flow. The flow rate of the second fluid may be regulated by rotating the valve member between the second end position (i.e., a maximum flow position for the second fluid) and the second intermediate potion (i.e., a zero flow position) while maintaining the flow rate of the first fluid at zero flow.

The 270 degree rotation allows the flow rates for both the first fluid and the second fluid to be controlled throughout discrete 90 degree portions of the total 270 degree rotational range. By using a full 90 degrees to transition from maximum flow to minimum flow, the flow rates of the first and second fluid can be controlled more accurately and precisely than with traditional flow control valves and/or control processes.

According to other valve configurations, the valve body has a valve chamber and a plurality of ports into the valve chamber. The plurality of ports may include a first port, a second port, and a third port. The first port and the second port may be disposed at approximately equal distances and/or angles relative to the third port. For example, the first port and the second port may both be oriented at the same or approximately the same angle relative to the third port (e.g., 45 degrees, 60 degrees, 90 degrees, 120 degrees, etc.). The first port may be oriented at a particular angle relative to the third port in a first direction about an axis of rotation. The second port may be oriented at the same or approximately the same angle relative to the third port, but in a second direction about the axis of rotation opposite the first direction. The third port may be equidistant from the first port and the second port.

The valve member may be configured to rotate within the valve chamber to modulate fluid flow between the first port and the third port while maintaining the second port completely closed and to modulate fluid flow between the second port and the third port while maintaining the first port completely closed. The valve member may be configured to rotate by an amount approximately equal to a complete rotation less the angular difference in orientation between the third port and either the first port or the second port. For example, if the first port (or the second port) is oriented at approximately 90 degrees relative to the third port, the valve member may be configured to rotate by approximately 270 degrees (i.e., 360 degrees–90 degrees=270 degrees). If the first port (or the second port) is oriented at approximately 120 degrees relative to the third port, the valve member may be configured to rotate by approximately 240 degrees (i.e., 360 degrees–120 degrees=240 degrees). Rotating the valve member may regulate a flow rate of a first fluid supply from the first port to the third port and a flow rate of a second fluid supply from the second port to the third port without mixing the first fluid supply and the second fluid supply.

The valve member may include an angled fluid passage extending through the valve member, the angle of the fluid passage corresponding to the difference in angular orientation between the third port and either the first port or the second port. Rotating the valve member by between the first end position and the second end position may cause the valve member to rotate through a first intermediate position approximately one-third of the total angular rotation of the valve member from the first end position and a second intermediate position approximately two-thirds of the total angular rotation of the valve member from the first end position. In both the first intermediate position and the second intermediate position, none of the plurality of ports may be fluidly connected with one another.

In some valve configurations, the valve includes a valve body, a valve member, and an actuator configured to controllably rotate the valve member relative to the valve body. The valve may further include a controller configured to operate the actuator to switch, without mixing, between at least one of: multiple fluid supplies and multiple fluid returns. The valve member may have an angled passage extending therethrough. The controller may be configured to cause rotation of the valve member by a complete rotation, less the angle of the angled passage. For example, if the angled passage has a 90 degree angle, the controller may cause rotation of the valve member by 270 degrees (i.e., 360 degrees–90 degrees=270 degrees). If the angled passage has a 120 degree angle, the controller may cause rotation of the valve member by 240 degrees (i.e., 360 degrees−120 degrees=240 degrees).

The controller may be configured to rotate the valve member between a first position and a second position. The valve member can be rotated in either a first direction by a first number of degrees (e.g., 90 degrees, 120 degrees, etc.) to transition between the first position and the second position or in a second direction by a second number of degrees (e.g., 270 degrees, 240 degrees, etc.) to transition between the first position and the second position. The first number of degrees and the second number of degrees may sum to 360 degrees. The controller may be configured to rotate the valve member by the greater of the first number of degrees and the second number of degrees to transition between the first position and the second position.

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling fluid flow, the system comprising:
    a valve assembly comprising:
        a valve body having a valve chamber and a plurality of ports into the valve chamber, the plurality of ports comprising a first port, a second port, and a third port, wherein the first port and the second port are aligned with a common axis and located on opposite sides of the valve chamber, and wherein the third port is aligned with a central axis extending transversely from the common axis; and
        a valve member located within the valve chamber, wherein the valve member is controllably rotatable about a rotational axis and along an angular travel of approximately 270 degrees to continuously modulate fluid flow between the first port and the third port over a first rotational range of approximately 90 degrees while maintaining the second port completely closed and to continuously modulate fluid flow between the second port and the third port over a second rotational range of approximately 90 degrees while maintaining the first port completely closed, wherein the rotational axis is perpendicular to the common axis and the central axis; and
    an electronically-controllable actuator including an electric motor rotatably coupled to a stem of the valve member, the electric motor configured to rotate the valve member to achieve a desired setpoint at which the valve member can be held stationary;
    wherein the desired setpoint corresponds to any rotational location along the angular travel; and
    wherein the valve member is configured to rotate approximately 270 degrees between:
        a first end position in which the first port is fluidly connected with the third port and the second port is closed; and
        a second end position in which the second port is fluidly connected with the third port and the first port is closed.

2. The system of claim 1, wherein the valve body is configured to receive a first fluid supply at the first port and a second fluid supply at the second port;
    wherein rotating the valve member by approximately 270 degrees continuously regulates a flow rate of the first fluid supply to the third port and continuously regulates a flow rate of the second fluid supply to the third port without mixing the first fluid supply and the second fluid supply.

3. The system of claim 1, wherein the valve member comprises an L-shaped fluid passage extending through the valve member, the fluid passage having an opening at an end thereof;
    wherein the opening is sufficiently large to span a distance between the plurality of ports such that the opening is capable simultaneously overlapping with the third port and at least one of: the first port and the second port.

4. The system of claim 1, wherein rotating the valve member by approximately 270 degrees between the first end position and the second end position causes the valve member to rotate through:
    a first intermediate position approximately 90 degrees from the first end position; and
    a second intermediate position approximately 90 degrees from the second end position;
    wherein, in both the first intermediate position and the second intermediate position, none of the plurality of ports are fluidly connected with one another.

5. The system of claim 4, wherein continuously modulating fluid flow between the first port and the third port comprises rotating the valve member between the first end position and the first intermediate position; and
    wherein continuously modulating fluid flow between the second port and the third port comprises rotating the valve member between the second end position and the second intermediate position.

6. The system of claim 1, wherein the third port is aligned with a second axis substantially perpendicular to the common axis; and
    wherein the valve member is configured to rotate about an axis of rotation substantially perpendicular to both the common axis and the second axis.

7. The system of claim 1, wherein the valve member comprises:
    a rotatable ball having an L-shaped fluid passage extending therethrough, wherein the L-shaped fluid passage is the only fluid passage through the rotatable ball.

8. The system of claim 1, wherein the valve member is configured to direct fluid flow through the valve chamber only in one or more directions substantially perpendicular to an axis of rotation of the valve member.

9. The system of claim 1, wherein the second rotational range is located between approximately 180 degrees and 270 degrees of the angular travel of the valve member.

10. The system of claim 1, wherein the valve member includes a first stop and a second stop;
    wherein the first stop defines the first end position;
    wherein the second stop defines the second end position; and
    wherein the valve member facilitates continuous rotation between the first end position and the second end position.

11. The system of claim 1, wherein the electric motor is rotatably coupled to a second stem of a second valve member of a second valve assembly, such that the electric motor is configured to cause simultaneous rotation of the stem of the valve member of the valve assembly and of the second stem of the second valve member of the second valve assembly.

12. A method for controlling fluid flow through a valve assembly, the method comprising:

providing a valve body having a valve chamber and a plurality of ports into the valve chamber, the plurality of ports comprising a first port, a second port, and a third port; and rotating, by an electric motor forming part of an electronically-controllable actuator, a stem of a valve member about a rotational axis and along an angular travel of approximately 270 degrees within the valve chamber to continuously modulate fluid flow between the first port and the third port over a first rotational range of approximately 90 degrees while maintaining the second port completely closed and to continuously modulate fluid flow between the second port and the third port over a second rotational range of approximately 90 degrees while maintaining the first port completely closed;

wherein the actuator is configured to hold the valve member stationary at a desired setpoint corresponding to any rotational location along the angular travel;

wherein the rotational axis is perpendicular to a central axis of the third port and to at least one of a central axis of the first port and a central axis of the second port; and wherein the electric motor is rotatable coupled to the stem of the valve member.

13. The method of claim 12, further comprising:
receiving a first fluid supply at the first port and a second fluid supply at the second port;
wherein continuously modulating fluid flow between the first port and the third port comprises continuously regulating a flow rate of the first fluid supply to the third port;
wherein continuously modulating fluid flow between the second port and the third port comprises continuously regulating a flow rate of the second fluid supply to the third port; and
wherein continuously regulating the flow rates occurs without mixing the first fluid supply and the second fluid supply.

14. The method of claim 12, wherein the valve member comprises an L-shaped fluid passage extending through the valve member, the fluid passage having an opening at an end thereof;
wherein rotating the valve member approximately 270 degrees comprises rotating the valve member into a rotational position wherein the opening spans a distance between the plurality of ports and simultaneously overlaps with the third port and at least one of: the first port and the second port.

15. The method of claim 12, wherein rotating the valve member approximately 270 degrees comprises rotating the valve member between:
a first end position in which the first port is fluidly connected with the third port and the second port is closed; and
a second end position in which the second port is fluidly connected with the third port and the first port is closed.

16. The method of claim 15, wherein rotating the valve member by approximately 270 degrees between the first end position and the second end position comprises rotating the valve member through:
a first intermediate position approximately 90 degrees from the first end position; and
a second intermediate position approximately 90 degrees from the second end position;
wherein, in both the first intermediate position and the second intermediate position, none of the plurality of ports are fluidly connected with one another.

17. The method of claim 16, wherein continuously modulating fluid flow between the first port and the third port comprises rotating the valve member between the first end position and the first intermediate position; and
wherein continuously modulating fluid flow between the second port and the third port comprises rotating the valve member between the second end position and the second intermediate position.

18. The method of claim 16, further comprising:
maintaining the third port completely closed while rotating the valve member between the first intermediate position and the second intermediate position.

19. The method of claim 12, wherein the first port and the second port are aligned with a common axis and located on opposite sides of the valve chamber;
wherein the third port is aligned with a second axis substantially perpendicular to the common axis; and
wherein the valve member is configured to rotate about an axis of rotation substantially perpendicular to both the common axis and the second axis.

20. A system for controlling fluid flow, the system comprising:
a valve assembly having a valve body and a valve member;
an electronically-controllable actuator including an electric motor rotatably coupled to a stem of the valve member to controllably rotate the valve member about a rotational axis and along an angular travel of approximately 270 degrees relative to the valve body; and
an electronic controller configured to operate the actuator to switch, without mixing, between at least one of: multiple fluid supplies and multiple fluid returns;
wherein the controller operates the actuator to continuously and independently modulate fluid flow for each of the fluid supplies and fluid returns between a maximum flowrate and a minimum flowrate over separate rotational ranges of approximately 90 degrees each;
wherein the actuator is configured to hold the valve member stationary at a desired setpoint corresponding to any rotational location along the angular travel;
wherein the valve body comprises a valve chamber and a plurality of ports into the valve chamber, the plurality of ports comprising a first port, a second port, and a third port;
wherein the valve member is located within the valve chamber and controllably rotatable therein; and
wherein the rotational axis is perpendicular to a central axis of the third port and to at least one of a central axis of the first port and a central axis of the second port.

21. The system of claim 20, wherein the actuator is configured to controllably rotate the valve member by approximately 270 degrees in response to a control signal from the controller to continuously modulate fluid flow between the first port and the third port while maintaining the second port completely closed and to continuously modulate fluid flow between the second port and the third port while maintaining the first port completely closed.

22. The system of claim 20, wherein one of the separate rotational ranges is located between approximately 180 degrees and 270 degrees of the angular travel of the valve member.

23. The system of claim 20, further comprising a spring configured to interface with the valve body and the valve member;
wherein the angular travel is defined between a first end position and a second end position; and wherein the spring is configured to bias the valve member towards one of the first end position and the second end position.

* * * * *